United States Patent
Kamykowski

[11] Patent Number: 5,960,554
[45] Date of Patent: Oct. 5, 1999

[54] STUD LAYOUT TEMPLATE

[76] Inventor: Brent F. Kamykowski, 5702 West 845, Burbank, Ill. 60459

[21] Appl. No.: 09/213,114

[22] Filed: Dec. 17, 1998

[51] Int. Cl.⁶ .................................. G01B 3/14; B43L 7/00
[52] U.S. Cl. .................................. 33/562; 33/486; 33/487
[58] Field of Search .............................. 33/486, 487, 526, 33/562, 563, 574

[56] References Cited

U.S. PATENT DOCUMENTS

| | | | |
|---|---|---|---|
| 1,659,739 | 2/1928 | Kuhlman | 33/486 |
| 3,258,844 | 7/1966 | Godman | 33/486 |
| 4,361,964 | 12/1982 | Hennessee | 33/563 |
| 4,928,399 | 5/1990 | Kragt | 33/562 |
| 4,930,225 | 6/1990 | Phillips | 33/562 |
| 5,090,129 | 2/1992 | Cunningham | 33/562 |
| 5,459,937 | 10/1995 | Albin et al. | 33/479 |
| 5,482,096 | 1/1996 | Russell | 33/562 |
| 5,706,586 | 1/1998 | Payne | 33/563 |

*Primary Examiner*—Diego Gutierrez
*Assistant Examiner*—Quyen Doan

[57] ABSTRACT

A stud layout template for marking locations for the placement of studs on a floor plate or a ceiling plate using center lines on the respective floor or ceiling plate. The stud layout template includes a plate having a main portion and an end portion outwardly extending from the main portion. The main portion has a cutout therethrough having an outer periphery comprising a pair of ends and a pair of sides extending between the ends of the cutout. The plate has an extent extending into the cutout from a first end of the cutout. The extent of the plate has a pair of side edges converging together to form a pointer vertex positioned substantially equidistantly between the sides of the cutout.

7 Claims, 2 Drawing Sheets

STUD LAYOUT TEMPLATE

BACKGROUND OF THE INVENTION

1. Field of the Invention

The present invention relates to layout templates and more particularly pertains to a new stud layout template for marking locations for the placement of studs on a floor plate or a ceiling plate using center lines on the respective floor or ceiling plate.

2. Description of the Prior Art

The use of layout templates is known in the prior art. More specifically, layout templates heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,367,783 by Nygren; U.S. Pat. No. 4,670,990 by Horvath; U.S. Pat. No. 4,212,108 by Jackson; U.S. Pat. No. 2,723,369 by Brummett; U.S. Pat. No. 4,499,666 by Smith; and U.S. Pat. No. Des. 314,520 by Hass.

While these devices fulfill their respective, particular objectives and requirements, the aforementioned patents do not disclose a new stud layout template. The inventive device includes a plate having a main portion and an end portion outwardly extending from the main portion. The main portion has a cutout therethrough having an outer periphery comprising a pair of ends and a pair of sides extending between the ends of the cutout. The plate has an extent extending into the cutout from a first end of the cutout. The extent of the plate has a pair of side edges converging together to form a pointer vertex positioned substantially equidistantly between the sides of the cutout.

In these respects, the stud layout template according to the present invention substantially departs from the conventional concepts and designs of the prior art, and in so doing provides an apparatus primarily developed for the purpose of marking locations for the placement of studs on a floor plate or a ceiling plate using center lines on the respective floor or ceiling plate.

SUMMARY OF THE INVENTION

In view of the foregoing disadvantages inherent in the known types of layout templates now present in the prior art, the present invention provides a new stud layout template construction wherein the same can be utilized for marking locations for the placement of studs on a floor plate or a ceiling plate using center lines on the respective floor or ceiling plate.

The general purpose of the present invention, which will be described subsequently in greater detail, is to provide a new stud layout template apparatus and method which has many of the advantages of the layout templates mentioned heretofore and many novel features that result in a new stud layout template which is not anticipated, rendered obvious, suggested, or even implied by any of the prior art layout templates, either alone or in any combination thereof.

To attain this, the present invention generally comprises a plate having a main portion and an end portion outwardly extending from the main portion. The main portion has a cutout therethrough having an outer periphery comprising a pair of ends and a pair of sides extending between the ends of the cutout. The plate has an extent extending into the cutout from a first end of the cutout. The extent of the plate has a pair of side edges converging together to form a pointer vertex positioned substantially equidistantly between the sides of the cutout.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new stud layout template apparatus and method which has many of the advantages of the layout templates mentioned heretofore and many novel features that result in a new stud layout template which is not anticipated, rendered obvious, suggested, or even implied by any of the prior art layout templates, either alone or in any combination thereof.

It is another object of the present invention to provide a new stud layout template which may be easily and efficiently manufactured and marketed.

It is a further object of the present invention to provide a new stud layout template which is of a durable and reliable construction.

An even further object of the present invention is to provide a new stud layout template which is susceptible of a low cost of manufacture with regard to both materials and labor, and which accordingly is then susceptible of low prices of sale to the consuming public, thereby making such stud layout template economically available to the buying public.

Still yet another object of the present invention is to provide a new stud layout template which provides in the apparatuses and methods of the prior art some of the advantages thereof, while simultaneously overcoming some of the disadvantages normally associated therewith.

Still another object of the present invention is to provide a new stud layout template for marking locations for the placement of studs on a floor plate or a ceiling plate using center lines on the respective floor or ceiling plate.

Yet another object of the present invention is to provide a new stud layout template which includes a plate having a main portion and an end portion outwardly extending from the main portion. The main portion has a cutout therethrough having an outer periphery comprising a pair of ends and a pair of sides extending between the ends of the cutout. The plate has an extent extending into the cutout from a first end of the cutout. The extent of the plate has a pair of side edges converging together to form a pointer vertex positioned substantially equidistantly between the sides of the cutout.

Still yet another object of the present invention is to provide a new stud layout template that eliminates the time consuming task of measuring out side lines off a center line for demarcating the location of a stud on a floor or ceiling plate when forming a wall frame.

Even still another object of the present invention is to provide a new stud layout template that ensures that the side lines are properly positioned for every center line marked on a floor or ceiling plate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
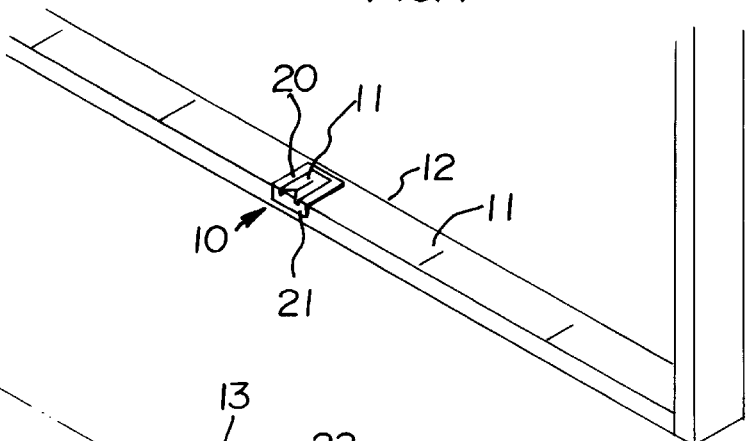
FIG. 1 is a schematic perspective view of a new stud layout template in use on a floor plate according to the present invention.

With reference now to the drawings, and in particular to FIGS. 1 through 4 thereof, a new stud layout template embodying the principles and concepts of the present invention and generally designated by the reference numeral 10 will be described.

As best illustrated in FIGS. 1 through 4, the stud layout template 10 generally comprises a plate having a main portion and an end portion outwardly extending from the main portion. The main portion has a cutout therethrough having an outer periphery comprising a pair of ends and a pair of sides extending between the ends of the cutout. The plate has an extent extending into the cutout from a first end of the cutout. The extent of the plate has a pair of side edges converging together to form a pointer vertex positioned substantially equidistantly between the sides of the cutout.

In use, the stud layout template 10 is designed for marking side lines off of a center line on 11 a floor or ceiling plate 12 for indicating the placement of studs on the floor or ceiling plate. In closer detail, the stud layout template comprises a generally rectangular plate 10 having substantially planar and generally rectangular first and second faces 13,14, a pair of substantially straight end edges 15,16, and a pair of substantially straight side edges 17,18 extending between the end edges of the plate. The end edges of the plate are extended substantially parallel to one another and the side edges of the plate are extended substantially parallel to one another and substantially perpendicular to the end edges of the plate. Optionally, the plate may have rounded corners to help prevent injury to a user. The plate has a thickness defined between the first and second faces of the plate, a length defined between the end edges of the plate and a width defined between the side edges of the plate. In an ideal illustrative embodiment, the thickness of the plate is about $\frac{1}{16}^{th}$ inch, the length of the plate is about 7¼ inches, and the width of the plate is about 6 inches.

Figure 2:
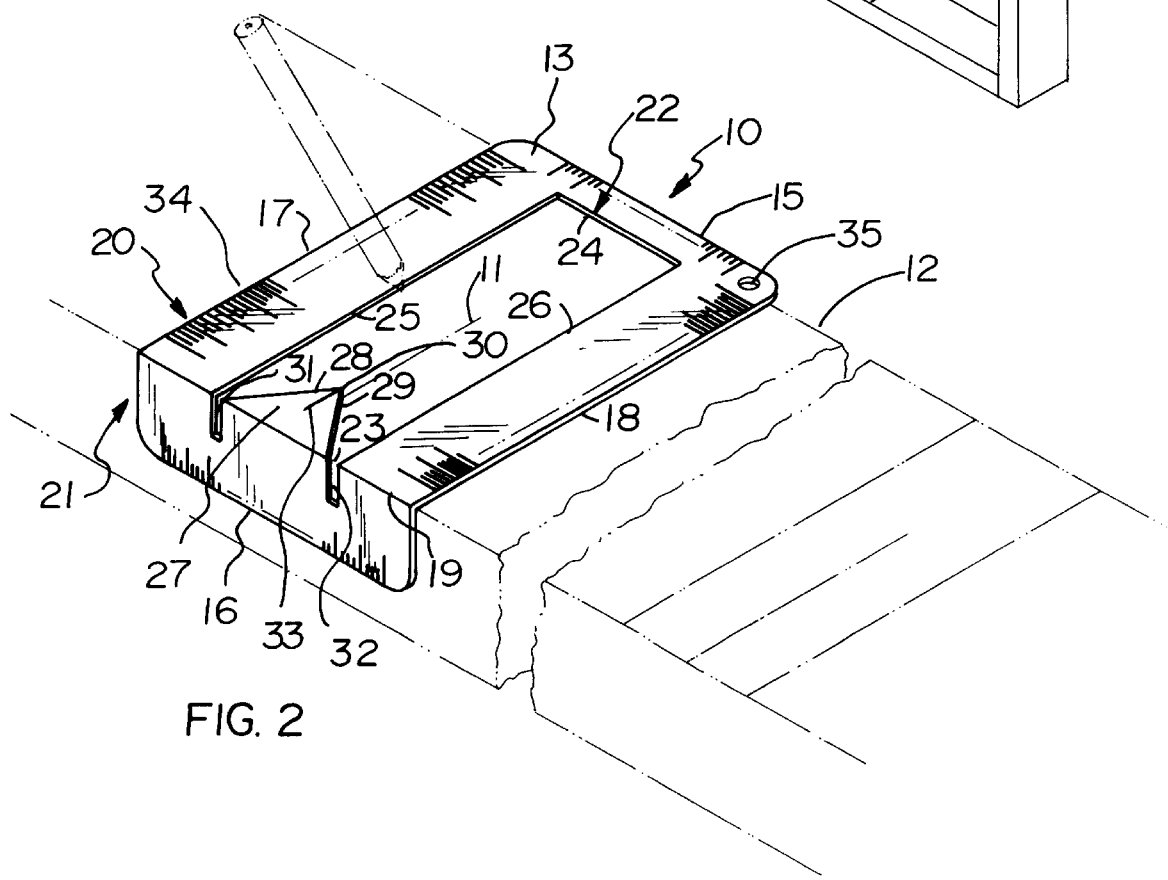
FIG. 2 is a schematic enlarged perspective view of the present invention in use.
Figure 3:
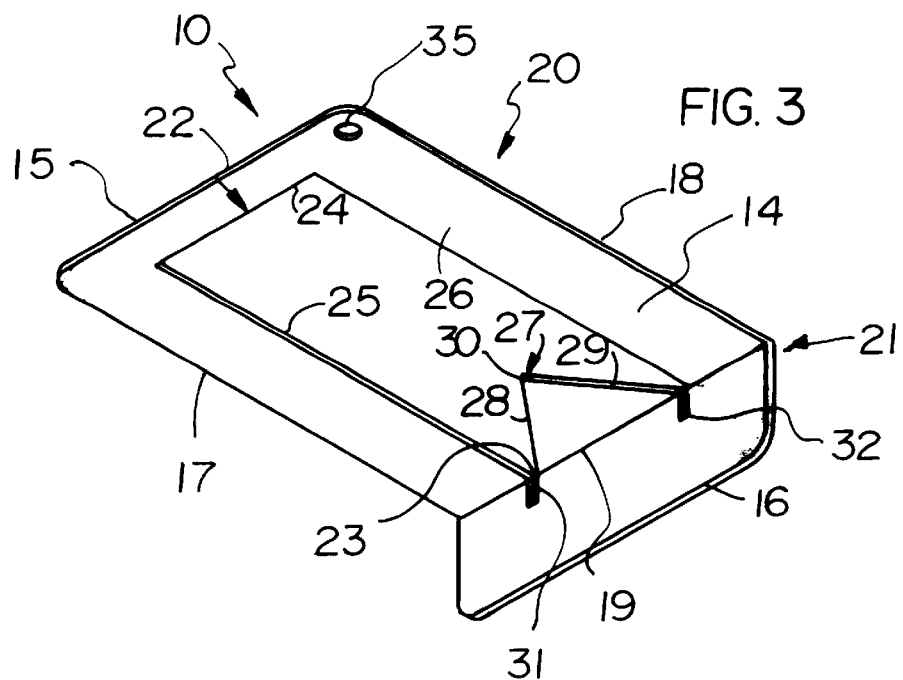
FIG. 3 is a schematic bottom perspective view of the present invention.

The plate has a bend 19 positioned towards one of the end edges of the plate and extending between the side edges of the plate substantially parallel to the end edges of the plate. The bend dividing the plate into a generally rectangular main portion 20 and a generally rectangular end portion 21. Preferably, the end portion is extended substantially perpendicular to the main portion in an outwards direction from the portion of the second face of the plate in the main portion of the plate. The bend permits adjustment of the angle between the main portion and the end portion for use in applications where the floor or ceiling plates have a side face extending at a non-right angle to the top face of the floor or ceiling plate. The main portion has a length defined between the bend and a first end edge of the plate while the end portion has a length defined between the bend and a second end edge of the plate. Ideally, the length of the main portion is about 6 inches and the length of the end portion is about 1¼ inches. In use, the main portion is designed for resting on a floor or ceiling plate on the second face of the plate with the end portion hanging over a side of the floor or ceiling plate as illustrated in FIGS. 1 and 2.

The main portion has a generally rectangular cutout 22 therethrough between the first and second faces of the plate. The cutout has an outer periphery comprising a pair of substantially parallel ends 23,24 and a pair of substantially parallel sides 25,26 extending substantially perpendicular to the ends of the cutout. The ends of the cutout are extended substantially parallel to the end edges of the plate and the sides of the cutout are extended substantially parallel to the side edges of the plate. A first of the ends of the cutout is positioned adjacent the end portion of the plate and the bend of the plate while the second end of the cutout is positioned towards the first end edge of the plate opposite the end portion of the plate. The cutout has a length defined between the ends of the cutout and a width defined between the sides of the cutout. In the ideal illustrative embodiment, the length of the cutout is about 5 inches and the width of the cutout is about 1½ inches.

The plate has a generally triangular extent 27 extending into the cutout from the first end of the cutout adjacent the end portion of the plate. Preferably, the extent and the main portion of the plate lie in a common plane with one another. The extent of the plate has a pair of side edges 28,29 converging together in a direction towards the second end of the cutout to form a pointer vertex 30. The sides of the extent each are extended from the pointer vertex to an associated adjacent side of the cutout. Preferably, the sides of the extent are extended substantially perpendicular to each other at the pointer vertex. The pointer vertex is positioned substantially equidistantly between the sides of the cutout such that the pointer vertex is centered between the sides of the cutout. In the ideal embodiment, the pointer vertex is spaced apart about ¾ inch from each of the sides of the cutout.

Optionally, the end portion of the plate may have a spaced apart pair of generally rectangular slits 31,32 outwardly extending from the first end of the cutout towards the end edge of the plate adjacent the end portion. A first of the slits is positioned between one of the sides of the cutout and an adjacent associated side of the cutout and the second slit is positioned between the other of the sides of the cutout and an adjacent associated side of the cutout such that the extent is positioned between the slits.

The extent of the plate preferably has a center line indicia 33 on the first face of the plate adjacent the pointer vertex. The center line indicia is extended substantially parallel to the sides of the cutout. In use, the center line indicia is designed for positioning the pointer along a center line on a floor or ceiling plate. In use, the cutout is designed for permitting viewing of stud location center lines on the floor and ceiling plates. The pointer vertex is designed for positioning on the stud location center line with the sides of the cutout designed for guiding the drawing of stud side guide lines on the floor or ceiling plate. In use, the slits are designed for extending the stud side guide line marks on to the side of the floor or ceiling plate.

In an ideal embodiment, each of the edges of the plate has ruler 34 or measuring indicia therealong on the first face of the plate. Also ideally, the plate has a generally circular hole 35 therethrough at a corner adjacent the end edge of the plate opposite the end portion. In use, the hole of the plate is designed for permitting hanging of the plate on a hanger.

Figure 4:
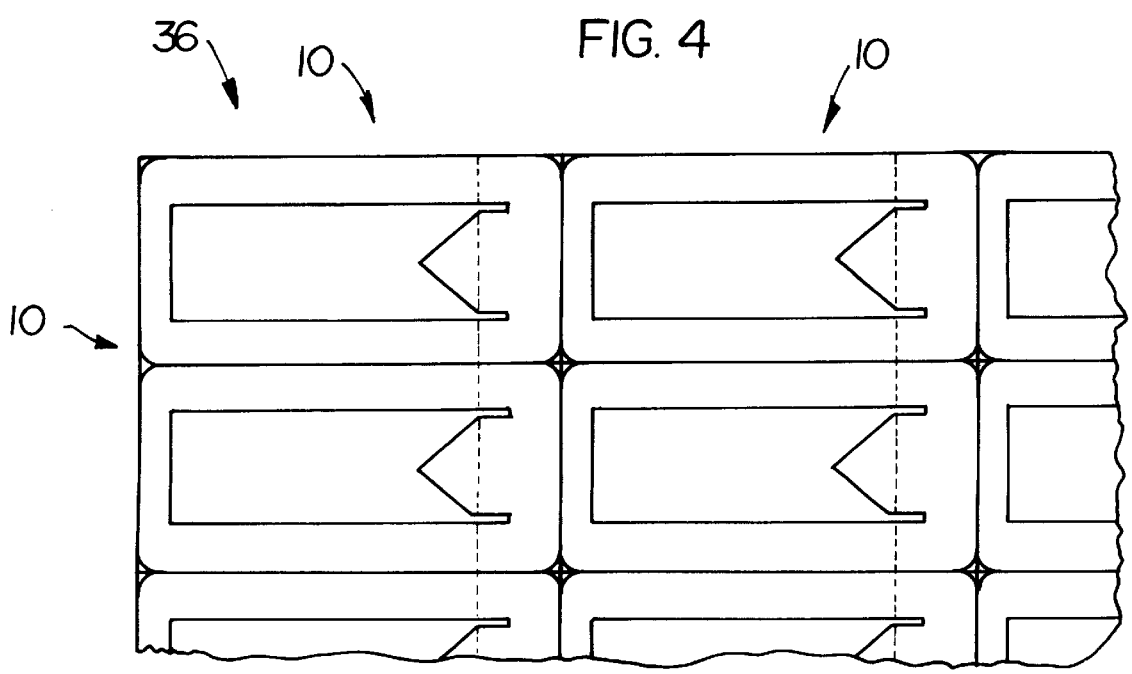
FIG. 4 is a schematic plan view of a sheet for forming a plurality of the present invention in an ideal means of manufacture.

With reference to FIG. 4, in an ideal means of manufacture, a generally rectangular sheet is provided having a plurality of plates arranged in a plurality of rows and column. These plates are cut from the sheet to form a plurality of stud layout templates.

In use, a user first marks stud location center lines on the floor or ceiling plate. The stud layout template is placed on the floor or ceiling plate so that a stud location center line is visible through the cutout and the pointer vertex is position on the stud location center line. The user then draws the stud side guide lines along the sides of the cutout and the slits. The stud layout template may then be moved to the next stud location center line to repeat the process.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stud layout template, comprising:
   a plate having a main portion and an end portion outwardly extending from said main portion;
   said main portion having a cutout therethrough;
   said cutout having an outer periphery comprising a pair of ends and a pair of sides extending between said ends of said cutout;
   a first of said ends of said cutout being positioned adjacent said end portion of said plate;
   said plate having an extent extending into said cutout from said first end of said cutout; and
   said extent of said plate having a pair of sides converging together to form a pointer vertex.

2. The stud layout template of claim 1, wherein said extent and said main portion of said plate lie in a common plane with one another.

3. The stud layout template of claim 1, wherein said pointer vertex is positioned substantially equidistantly between said sides of said cutout.

4. The stud layout tool of claim 1, wherein said plate has a spaced apart pair of slits extending from said first end of said cutout towards said end portion, a first of said slits being positioned between one of said sides of said cutout and an adjacent associated side of said cutout, a second of said slits being positioned between the other of said sides of said cutout and an adjacent associated side of the cutout.

5. The stud layout tool of claim 1, wherein said extent of said plate has a center line indicia adjacent said pointer vertex, said center line indicia being extended substantially parallel to said sides of said cutout.

6. The stud layout tool of claim 1, wherein said main portion of said plate has a hole therethrough.

7. A stud layout template for marking side lines off of a center line on a floor or ceiling plate for indicating the placement of studs on the floor or ceiling plate, said stud layout template comprising:
   a generally rectangular plate having substantially planar and generally rectangular first and second faces, a pair of substantially straight end edges, and a pair of substantially straight side edges extending between said end edges of said plate;
   said end edges of said plate being extended substantially parallel to one another, said side edges of said plate being extended substantially parallel to one another and substantially perpendicular to said end edges of said plate;
   said plate having a bend positioned towards one of said end edges of said plate, said bend of said plate being extended between said side edges of said plate substantially parallel to said end edges of said plate, said bend dividing said plate into a generally rectangular main portion and a generally rectangular end portion;
   said end portion being extended substantially perpendicular to said main portion;
   said main portion having a generally rectangular cutout therethrough between said first and second faces of said plate;
   said cutout having an outer periphery comprising a pair of substantially parallel ends and a pair of substantially parallel sides extending substantially perpendicular to said ends of said cutout;
   said ends of said cutout being extended substantially parallel to said end edges of said plate, said sides of said cutout being extended substantially parallel to said side edges of said plate;

a first of said ends of said cutout being positioned adjacent said end portion of said plate, a second of said ends of said cutout being positioned towards the end edge of said plate opposite said end portion of said plate;

said plate having a generally triangular extent extending into said cutout from said first end of said cutout adjacent said end portion of said plate;

said extent and said main portion of said plate lying in a common plane with one another;

said extent of said plate having a pair of sides converging together in a direction towards said second end of said cutout to form a pointer vertex;

said pointer vertex being positioned substantially equidistantly between said sides of said cutout;

said sides of said extent being extended substantially perpendicular to each other;

said sides of said extent each being extended from said pointer vertex to an associated adjacent side of said cutout;

said end portion of said plate having a spaced apart pair of slits extending from said first end of said cutout towards the end edge of said plate adjacent said end portion;

a first of said slits being positioned between one of said sides of said cutout and an adjacent associated side of said cutout, a second of said slits being positioned between the other of said sides of said cutout and an adjacent associated side of the cutout;

said extent of said plate having a center line indicia on said first face of said plate adjacent said pointer vertex, said center line indicia being extended substantially parallel to said sides of said cutout;

each of said edges of said plate having ruler indicia therealong on said first face of said plate; and said plate having a generally circular hole therethrough adjacent the end edge of said plate opposite said end portion.

* * * * *